United States Patent [19]

Föhl

[11] Patent Number: 4,838,499

[45] Date of Patent: Jun. 13, 1989

[54] CABLE BRAKING MEMBER FOR THE DRIVE OF A SAFETY BELT RETIGHTENER

[75] Inventor: Artur Föhl, Schorndorf, Fed. Rep. of Germany

[73] Assignee: TRW (Repa) GmbH, Alfdorf, Fed. Rep. of Germany

[21] Appl. No.: 168,188

[22] Filed: Mar. 15, 1988

[30] Foreign Application Priority Data

Mar. 27, 1987 [DE] Fed. Rep. of Germany ....... 3710032

[51] Int. Cl.[4] ............................................. B60R 22/46
[52] U.S. Cl. ................................. 242/107; 280/806; 242/153
[58] Field of Search ......... 242/107, 107.4 R, 153–154; 188/65.4, 65.5; 280/806; 297/478, 480

[56] References Cited

U.S. PATENT DOCUMENTS

| | | | |
|---|---|---|---|
| 481,086 | 8/1892 | Welty | 242/153 |
| 496,923 | 5/1893 | Walgren et al. | |
| 1,856,188 | 5/1932 | Holmes | 242/154 X |
| 4,549,704 | 10/1985 | Föhl | 242/107 |

FOREIGN PATENT DOCUMENTS

| | | | |
|---|---|---|---|
| 660174 | 4/1938 | Fed. Rep. of Germany | 242/153 |
| 3328874 | 5/1984 | Fed. Rep. of Germany | |
| 344658 | 3/1960 | Switzerland | 242/153 |

OTHER PUBLICATIONS

Hutte, Des Ingenieurs Taschenbuch (Engineer's Handbook), Berlin, 1955, pp. 1140–1142.

Primary Examiner—John M. Jillions
Attorney, Agent, or Firm—Tarolli, Sundheim & Covell

[57] ABSTRACT

The cable braking member for the drive of a safety belt retightener consists of three triangularly arranged stud-shaped obstructions between which the pulling cable is led. A progressing increase of the restraining force generated by the cable braking member is achieved in that the contacting faces of the stud-shaped obstructions are inclined at an angle of inclination of less than 90° to the guide plane of the pulling cable.

11 Claims, 1 Drawing Sheet

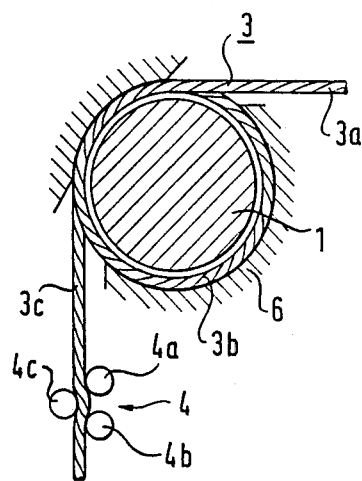
Fig.1
Fig.2
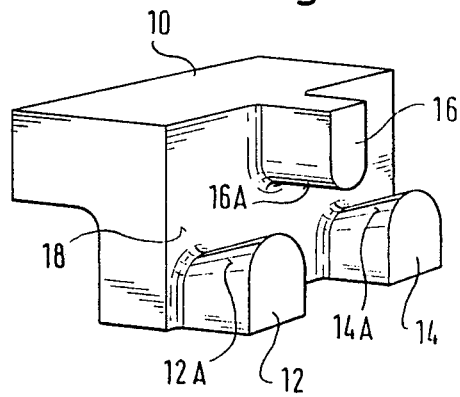
Fig.3
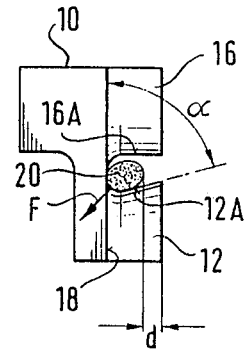
Fig.4
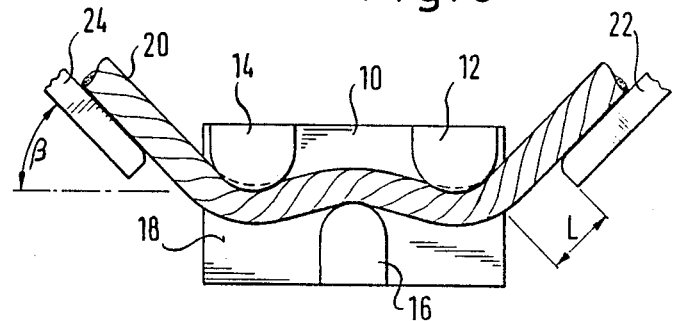
Fig.5

CABLE BRAKING MEMBER FOR THE DRIVE OF A SAFETY BELT RETIGHTENER

The invention relates to a cable braking member for the drive of a safety belt retightener.

German specification as laid open to inspection 3,231,807 discloses a safety belt tightening means whose drive comprises a pulley around which a pulling cable is wound several times. One end of the pulling cable is connected to a linear drive, for example a piston/cylinder drive, whilst the other free end is led through a cable braking member and is restrained therein by deflection at stationary obstructions projecting from the guide plane of the cable. The cable braking member is necessary in order to tighten the cable in the manner of a wrap-around coupling on the surface of the pulley.

Since the forces which can be transmitted via such a wraparound coupling are proportional to the restraining forces generated by the cable braking member, said restraining forces must be adequately high to permit transmission of the maximum required drive force to the pulley and by the latter to the belt spool of the tightening means. The linear drive of the tightening means must be so dimensioned that in addition to the necessary drive force for the tightening operation it also overcomes the restraining forces generated by the cable braking member which due to the cable wrap-around effect on the drive side of the cable increase exponentially with the wrap angle. However, to avoid having to exert an unnecessarily high drive force the restraining effect of the cable braking member should be as constant as possible.

The present invention provides a cable braking member by which in a safety belt retightener with wrap-around coupling the restraining forces generated by the cable braking member are consistently constant and in particular substantially independent of temperature fluctuations and production tolerances.

According to the invention, a cable braking member is provided which has a number of stationary obstructions projecting from a cable guide plane whereon the cable slides, at least one of these obstructions comprising a cable contacting face which is inclined at an angle of inclination of less than 90° to the guide plane. It has been found that by this simple measure a substantially constant restraining action of the cable braking member is achieved. Due to the contact face for the cable braking member being inclined to the guide plane at an angle of less than 90° said cable on running over the obstruction is drawn into the V-shaped gap which this inclined contact face forms with the guide plane. As a result the pulling cable runs uniformly between the guide plane and the inclined contact face. This opposes in particular the tendency of the cable to wander transversely of its longitudinal direction. Diameter changes of the cable due to production tolerances have hardly any effect on the restraining action. The latter also remain substantially constant within a wide temperature range of for example −40 to +80° C. A preferred embodiment of the invention provides a particularly uniform run of the cable. In this embodiment three obstructions arranged at the corners of a triangle are provided, of which the two obstructions adjacent each other with respect to the cable each have a contact face for the cable whose identical angle of inclination to the guide plane is less than 90° whilst preferably the contact face of the third obstruction lying opposite with respect to the cable is oriented perpendicularly to the guide plane. It has been found particularly favourable to provide an inclination angle of about 75° between the contact faces of the two obstructions and the guide plane.

Further advantageous features of the invention are set forth in the subsidiary claims.

An embodiment of the invention will now be described in detail with the aid of the drawings, wherein:

FIGS. 1 and 2 show schematic sectional views for explaining the mode of operation of a wrap-around coupling;

FIG. 3 is a perspective view of a cable braking member according to the invention for a wrap-around coupling of the type shown in FIGS. 1 and 2;

FIG. 4 is a side view of the cable brake shown in FIG. 3; and

FIG. 5 is a plan view of the cable braking member shown in FIGS. 3 and 4 with a cable led therethrough.

The wrap-around coupling shown in FIGS. 1 and 2 for converting a linear motion to a rotary motion consists of a pulley 1 which is non-rotatably connected to the belt spool of a safety belt tightening means (not shown), a pulling cable 3 wrapped around the pulley 1 in several convolutions and a cable brake 4. The cable 3 comprises a drive portion 3a connected to a linear drive (not shown), for example piston/cylinder drive with pyrotechnical charge, a wrap portion 3b encircling the pulley 1 and a free end portion 3c which is led through the cable brake 4. The cable brake 4 consists of three triangularly disposed cylindrical obstructions 4a, 4b, 4c between which the free end 3c of the cable 3 is led, the distances between said obstructions being so chosen that a deflection of the cable takes place. The restraining forces exerted on the free end 3c of the cable result from friction and deformation of the cable against its inherent stiffness. The inherent stiffness of the cable 3 also results in its wrap portion 3b remaining at a radial distance from the outer surface of the pulley 1 as long as no tension is present at the drive end 3a of the cable 3. This state is shown in FIG. 1. In this state at its outer side the cable 3 can bear on a guide wall 6 fixed with respect to the housing. However, as soon as a tensile force S2 is exerted at the drive end 3a, said force being provided by the activated linear drive, the cable 3 comes to lie with its wrap portion 3b on the surface of the pulley 1 and in the free end 3c of the cable the considerably smaller tensile force S1 occurs which is equal to the restraining force generated by the cable brake 4. This restraining force is however subject to fluctuations due to production tolerances, in particular in the cable properties, temperature fluctuations and a nonuniform run of the cable between the obstructions.

With the construction of the cable brake according to the invention illustrated in Figrues 3, 4 and 5 a substantially constant restraining force is exerted on the free end of the pulling cable. On a single generally block-shaped component 10 three stud-like obstructions 12, 14, 16 are integrally formed which project from a planar base surface 18 corresponding to the guide plane for the cable 20 (FIG. 5). As shown in FIG. 5 the two stud-shaped obstructions 12, 14 are arranged adjacent each other with respect to the cable 20 and spaced apart whilst the obstruction 16, again with respect to the cable 20, is arranged in spaced relationship opposite the two obstructions 12, 14. The contact faces for the cable 20 are designated by 12A, 14A, and 16A respectively. They are each convexly curved towards the cable. The contact face 16A of the obstruction 16 is oriented perpendicularly to the base surface 18. The contact faces 12A, 14A of the obstructions 12, 14 are however as shown in FIG. 4 inclined at an angle of inclination α with respect to the base surface 18 and follow said base surface via a curvature corresponding substantially to the cable diameter.

The inclination angle α is preferably about 75°. Between the contact faces 12A, 14A and the base surface 18 a U-shaped gap is thus formed in each case into which the cable 20 led therethrough is drawn with the resultant transverse force F (FIG. 4). By this transverse force F the cable 20 is prevented wandering up the obstructions 12, 14, 16 due to twisting, which might result in said cable coming free of the obstructions. Furthermore, a uniform engagement of the cable is achieved not only at the obstructions but also at the base surface 18.

As shown by FIG. 3 the cable brake according to the invention forms a single body which is adapted to be inserted into a complementarily shaped recess of the safety belt tightening means (not shown). This body can be economically produced as casting with great accuracy. Particularly favourable in the use of a zinc alloy which can be worked by pressure diecasting. If furthermore a steel cable is used as pulling cable a favourable material combination is achieved because zinc alloys are soft compared with steel and when running between the obstructions 12, 14, 16 the steel cable digs slightly into their surfaces, providing additional guiding of the cable.

A further improvement of the guiding of the cable 20 is achieved by wall portions 22, 24 which are arranged respectively at a small distance L from the outer obstructions 12, 14 and form an angle β with the running direction of the cable 20 between the obstructions 12, 14, 16. The cable 20 engages on one side on the inner faces of the guide walls 20, 24. The angle β is preferably about 30 to 45°.

As apparent from FIG. 4 the height of the obstructions 12, 14, 16 is preferably made a predetermined amount d greater than the greatest cross-sectional dimension of the cable 20 deformed to an oval cross-sectional shape under load. Thus, even without a fitted restraining plate or the like there is no danger of the cable 20 slipping upwards between the obstructions 12, 14, 16. The cross-sectional form of the cable 20 constrained between the obstructions 12, 14, 16 but not yet subjected to tension corresponds to the concave curvature with which each contact face 12A, 14A, 16A adjoins the base surface 18. The curvature of the cable 20 between the obstructions 12, 14, 16 results in a change in the cross-sectional form thereof because on the inner side of the curvature a compression occurs and on the outer side a tension in the configuration of the twisted cable strands. The changed cross-sectional form approaches that of an arc of an ellipse. The adaptation of the transition curvature of the contact faces 12A, 14A, 16A to this shape ensures small disturbance of the cable composite structure of the wire strands by increasing the engagement area at the obstructions so that a uniform restraining effect is obtained when the cable 20 passes between said obstructions.

I claim:

1. In a safety belt retightener associated with a retractor and including a pulley coupled to the reel of the retractor, a linear drive and a pulling cable wrapped around said pulley and having a first end connected to the linear drive a cable braking member through which said pulling cable extends and which restrains movement of said pulling cable therethrough, said cable braking member comprising means defining a guide surface and a plurality of obstructions projecting from said guide surface, each of said obstructions having a contact surface for frictionally engaging said pulling cable, the contact surface on at least one of said obstructions including means for urging said pulling cable into frictional engagement with said guide surface, said means for urging comprising a cable contact face inclined at an angle of inclination of less than 90° to said guide surface.

2. The cable braking member according to claim 1 comprising three obstructions which are disposed at the corners of a triangle and of which two thereof are arranged spaced from each other and the third of which is arranged opposite the space between the other two adjacent obstructions, wherein each of the contact surfaces on said two adjacent obstructions includes means for urging said pulling cable into frictional engagement with said guide surface, said means for urging comprising a cable contact face inclined at an angle of inclination of less than 90° to said guide surface.

3. The cable braking member according to claim 2, wherein said third obstruction has a cable contact face which is oriented perpendicularly to said guide surface.

4. The cable braking member according to claim 1, wherein the angle of inclination is substantially equal to 75°.

5. The cable braking member according to claim 2, wherein the three obstructions are formed as integral components, preferably by casting, with said means defining said guide surface.

6. The cable braking member according to claim 1, said cable being of steel and said obstructions are formed a relatively soft metal material compared with steel.

7. The cable braking member according to claim 6, wherein the material is a zinc alloy.

8. The cable braking member according to claim 1, wherein the height of the obstructions is greater than the greatest cross-sectional dimension of the cable deformed under load to an oval cross-section.

9. The cable braking member according to claim 1, wherein the cable in the running direction before and/or behind at least one of the obstructions is led through a guide wall which defines the entry and exit angle of the cable into and out of the cable braking member.

10. The cable braking member according to claim 9, wherein the guide wall terminates at a predetermined distance from the adjacent obstruction.

11. The cable braking member according to claim 1, wherein the cable contacting faces adjoining the guide surface via a concave curved portion whose form is adapted to the cross-sectional form of the cable constrained between the obstructions but not subjected to tension.

* * * * *